(12) United States Patent
Brooks et al.

(10) Patent No.: US 7,711,048 B2
(45) Date of Patent: May 4, 2010

(54) SYSTEM AND METHOD FOR VIDEO PROCESSING

(75) Inventors: David Brooks, Peterfield (GB); Michael James Knee, Petersfield (GB); Jonathan Diggins, Petersfield (GB)

(73) Assignee: Snell Limited, Hampshire (GB)

( * ) Notice: Subject to any disclaimer, the term of this patent is extended or adjusted under 35 U.S.C. 154(b) by 1430 days.

(21) Appl. No.: 11/097,149

(22) Filed: Apr. 4, 2005

(65) Prior Publication Data

US 2005/0220189 A1   Oct. 6, 2005

(30) Foreign Application Priority Data

Apr. 2, 2004   (GB) ............................... 0407591.7

(51) Int. Cl.
*H04B 1/66* (2006.01)

(52) U.S. Cl. .................. 375/240.15; 375/240.16; 375/240.12

(58) Field of Classification Search ............ 375/240.15, 375/240.16, 240.12; 382/236, 238, 235
See application file for complete search history.

(56) References Cited

U.S. PATENT DOCUMENTS

| | | | |
|---|---|---|---|
| 5,949,410 A | 9/1999 | Fung | |
| 6,101,276 A | 8/2000 | Adiletta et al. | |
| 6,122,321 A | 9/2000 | Sazzad et al. | |
| 6,600,872 B1 | 7/2003 | Yamamoto | |
| 6,751,405 B1 | 6/2004 | Hasegawa | |
| 2004/0160645 A1 * | 8/2004 | Nonaka et al. | ............... 358/479 |

FOREIGN PATENT DOCUMENTS

| | | |
|---|---|---|
| JP | 2000/299840 | 10/2000 |
| WO | WO 98/48573 | 10/1998 |

OTHER PUBLICATIONS

Lin Luo, et al: "Motion Compensated Lifting Wavelet and its Application in Video Coding." Multimedia and Expo, 2001. ICME 2001. IEEE International Conference on Aug. 22-25, 2001, Piscataway, NJ, USA, IEEE, Aug. 22, 2001.
Schwarz, H., et al: "Hierarchical B pictures" Joint Video Team (JVT) of Iso/Iec MPEG & ITU-T VCEG (Iso/Iec JTC1/SC29/WG11 and ITU-T SG16 Q6), Jul. 27, 2005, pp. 1-25.
Schwarz, H., et al: "SNR-Scalable Extension of H. 264/AVC." Joint Video Team (JVT) of Iso/Iec MPEG & ITU-T VCEG (Iso/Iec JTC1/SC29/WG11 and ITU-T SG16 Q6), Sep. 2, 2003, pp. 1-17.
Schwarz, H., et al: "SNR-Scalable Extension of H. 264/AVC/" Image Processing, 2004. ICIP '04. 2004 International Conference on Signapore Oct. 24-27, 2004, Piscataway, NJ, USA, IEEE Oct. 24, 2004, pp. 3113-3116.
"Text of Final Committee Draft of Joint Video Specification (ITU-T REC. H 264/ISO/IEC 14496-10 AVC)"International Organization for Standardization—Organisation Internationale de Normalisation, Jul. 2002, pp. I-XV, 1.
EP Search Report. Application No. EP 05252115, Aug. 15, 2005.
Search Report under Section 17. Application No. GB 0407591.7.

* cited by examiner

*Primary Examiner*—Shawn An
(74) *Attorney, Agent, or Firm*—Pearl Cohen Zedek Latzer, LLP

(57) ABSTRACT

A video program length is changed by processing an MPEG compressed video signal. Two temporally adjacent B-frames are selected, by looking for pairs with small differences. The selected B-frames are combined to create at least one intermediate frame; which is inserted in place of or between the selected frames. Presentation time stamps are altered to provide a uniform display rate.

9 Claims, 3 Drawing Sheets

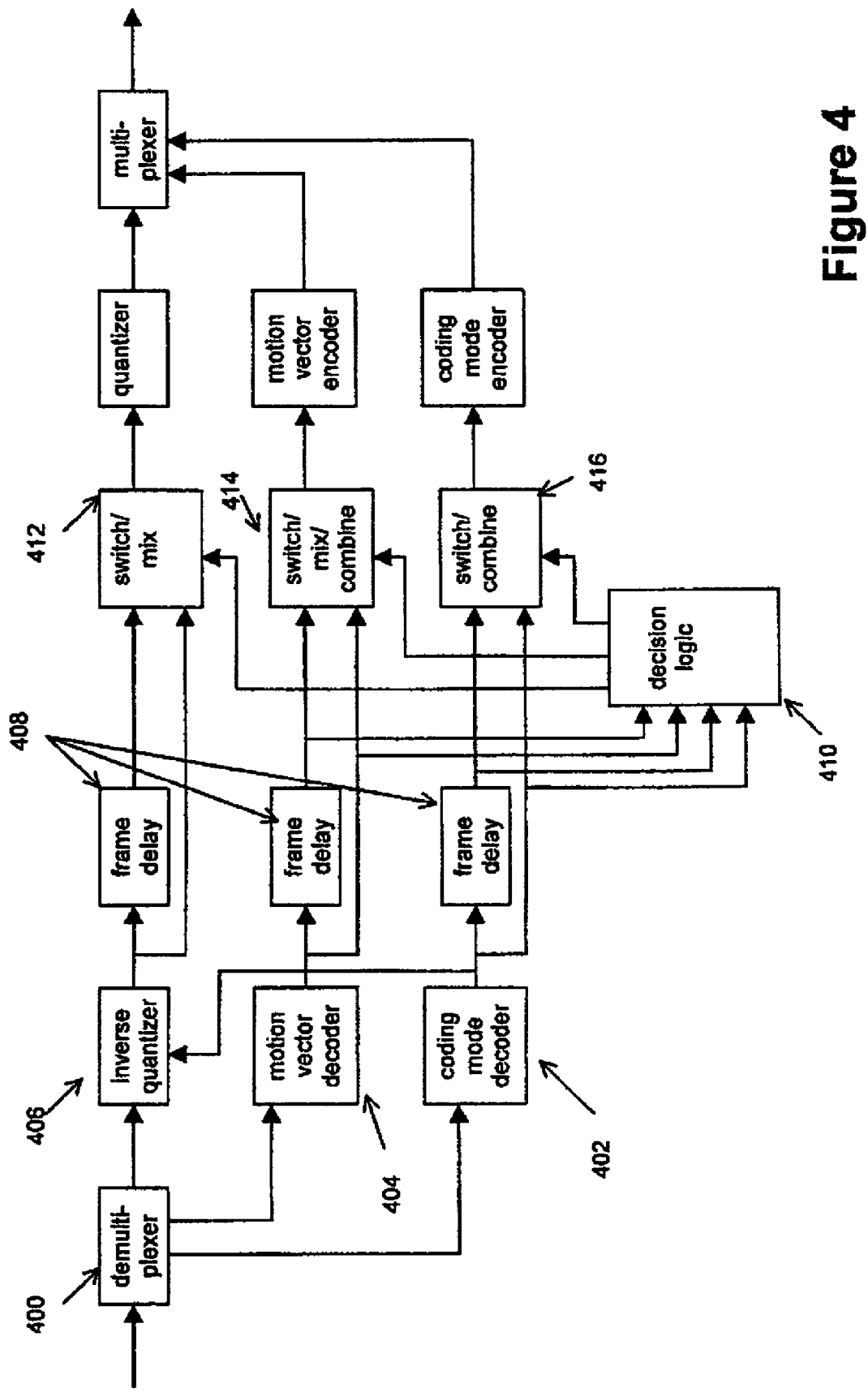

SYSTEM AND METHOD FOR VIDEO PROCESSING

RELATED APPLICATION DATA

The present application claims benefit from prior UK application No. 0407591.7, filed Apr. 2, 2004, incorporated by reference herein in its entirety.

BACKGROUND OF THE INVENTION

This invention relates to the field of video signal processing, and in particular to time compression or time expansion.

It is often desirable in the television industry for the content received by a broadcaster to be shortened in time, either to reduce the video program length to fit a desired time slot, or to provide additional broadcast time into which revenue-generating commercials can be inserted. Typically, a video program will be reduced in length by up to four percent.

One commercially available product operates by identifying candidate fields in the uncompressed video sequence and deleting them. A candidate field might be one in which there is close similarity with the neighbouring fields.

Automated deletion of fields is cost effective but can introduce motion and other artefacts. The alternative exists of reediting the material but this is likely to be expensive and time-consuming.

The present inventors have recognised that it would be desirable to be able to provide this type of time compression (or in appropriate cases, time expansion) in the compressed domain, and particularly in compression schemes that utilise groups of pictures of differing prediction types, such as long Group of Pictures (GOP) structures in MPEG and other schemes.

SUMMARY OF THE INVENTION

In a first aspect therefore the invention provides a method of changing a video program length by processing a compressed video signal which represents the video program, the compressed video signal including frames in different prediction categories, one prediction category comprising frames (B-frames) which are not employed in the prediction coding of other frames, the method comprising the steps of: selecting at least two temporally adjacent B-frames; combining said selected B-frames to create at least one intermediate frame; and inserting said intermediate frame or frames.

The inserted frames may be smaller in number than the selected frames and may replace them.

In this way, when the processed sequence is displayed at the standard frame rate, the sequence will obviously be shorter, and there will be little or no motion discontinuity across the deletion. The time compression can be conducted entirely in the encoded domain, without the need to revert to the underlying picture data itself.

B frames usually occur in pairs and preferably two temporally adjacent B frames are selected and combined to form a single intermediate frame, however other combinations of frames are possible, for example three adjacent B frames could be combined to form two intermediate frames. In an alternative, time expansion, arrangement, two adjacent B frames are used to create three B frames in the output.

The number of pairs of frames selected and substituted or supplemented can be varied to provide the required degree of time compression or time expansion.

The timing of the bitstream can be suitably altered to ensure that the processed sequence is output at the standard frame rate, preferably by adjusting the presentation time stamps.

Preferably pairs of adjacent B-frames which are similar are selected. The similarity of B-frames may be determined by comparison of the encoded frames for example by comparing DCT coefficients or by using motion vectors.

The intermediate frame may be an average of the two selected B-frames, may be interpolated from the two frames, or may be some other combination. The exact method of combination may depend on the pair of frames selected.

It will be necessary to provide for corresponding time compression of audio, and commercially available software is available to provide this function. In addition it will be necessary to ensure that lip-synch is maintained. While this is preferably conducted in a separate process downstream of the time compression process, the selection of B-frames for combining may be conducted with reference to the accompanying audio to minimise loss of lip-synch, or to correct for any loss of lip-synch.

It is a further aim of the invention to provide a compressed video bitstream which is readily time compressible.

In a second aspect the invention therefore provides a method of video compression coding, the method comprising:

identifying groups of at least two temporally adjacent frames which are to be coded as B-frames;

selecting, from said identified groups candidate groups of frames;

coding each of a candidate group of frames using the same coding modes; and flagging each said group of similarly coded candidate B-frames for identification in a time compression process.

Preferably groups of temporally adjacent frames comprise two adjacent frames, and candidate groups also comprise two frames, ie candidate pairs of frames are selected. By coding two adjacent B-frames using the same modes, they can be more easily combined to produce an intermediate frame during a downstream processing stage. Also, by flagging candidate frames, selection of pairs of B-frames to be combined downstream is simplified. Preferably, candidate frames are flagged using meta data.

More preferably, each pair of candidate frames can be assigned a value indicative of the order in which candidate frames should be combined in a time compression process. The value will typically be based on the perceived change which would be caused by combining that pair of frames in said time compression process. This value can be an absolute reference value, and need not specify an exact order. Parameters such as motion vectors or coding modes may be compared to asses this perceived change. Preferably, the encoding method, when identifying B-frames to be flagged as candidate frames, makes available additional motion vectors which can be used in the time compression process to combine selected B-frames.

In a preferred embodiment video encoding may make reference to an accompanying audio stream in determining the perceived change which would be caused by combining B-coded frames. For example, candidate frames which are less likely to result in the loss of lipsynch when processed may be prioritised.

In this way the downstream time compression process can—according to the desired degree of compression—select first the least perceptible B-frames for deletion and then progressively more perceptible B-frames.

In a still further embodiment the coding method replaces each of a pair of candidate B-frames with a combination of those two frames. This simplifies the downstream time compression process which, instead of combining two candidate B-frames, would simply delete one of them.

BRIEF DESCRIPTION OF THE DRAWINGS

Preferred embodiments will now be described by way of example and with reference to the accompanying drawings in which:

FIG. 4 is a schematic block diagram showing in more detail a circuit block from FIG. 3.

DETAILED DESCRIPTION

Figure 1:
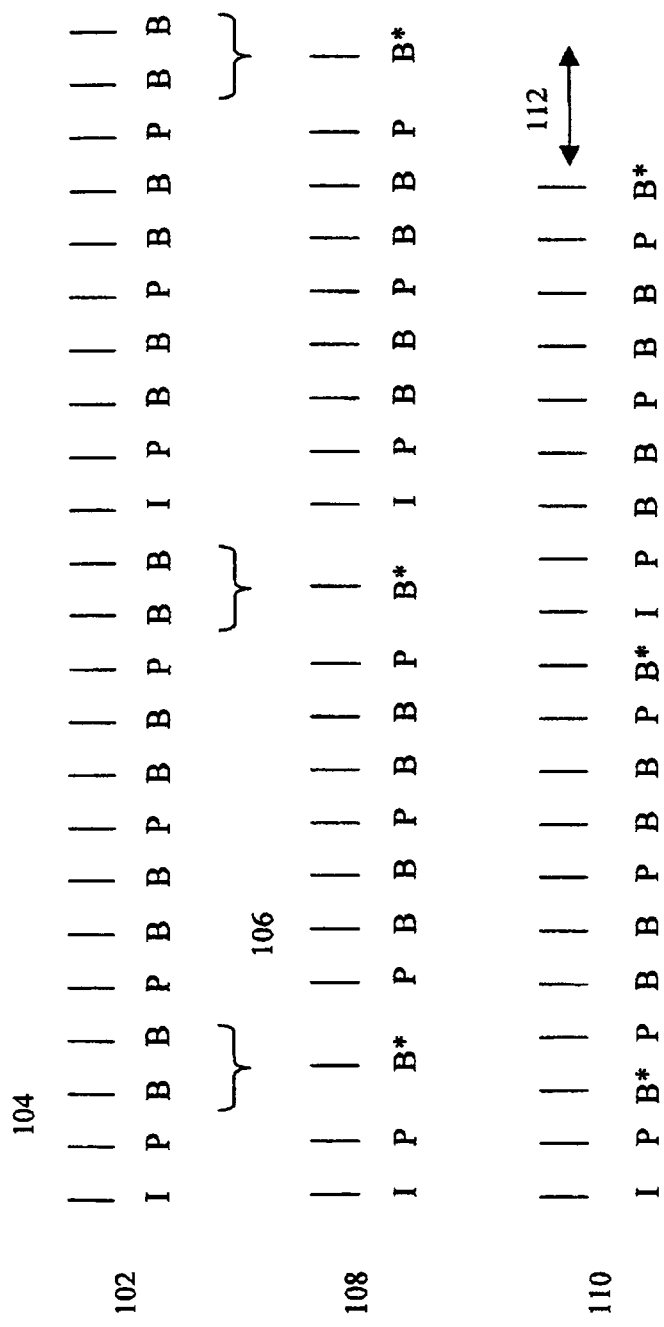
FIG. 1 illustrates the processing of a sequence of compressed video frames according to an embodiment of the present invention.

This invention will be described by taking the well-known MPEG compression standards as an example. A well understood feature of MPEG is the GOP structure in which frames of different prediction categories are grouped together. I-frames are intra-coded. P-frames are prediction coded. In long GOP structures there are typically also large numbers of B-frames that are prediction coded using both forward and backward pointing motion vectors. B-frames are not employed in the prediction coding of other frames.

Each frame is divided into macroblocks and motion vectors associated with macroblocks in are employed to motion compensate the prediction. For each macroblock, separate choices can be made in the coding mode for that macroblock.

The order in which the various frames of the GOP are transmitted in the GOP structure is of course different from the intended order of presentation. Different frames may contain different amounts of information. In the MPEG scheme, so-called presentation time stamps determine the time at which each frame is presented.

A simple way of reducing the length of an MPEG bitstream is to remove an appropriate number of B-frames, with subsequent amendment of presentation time stamps to ensure that the remaining I-, P- and B-frames are displayed at the standard frame rate. The deletion of B-frames if used indiscriminately is likely to result in perceptible motion judder. The effect of motion judder can be reduced by deleting only B-frames immediately preceding a cut. Deletion of these B-frames is most unlikely to be perceived by the viewer, due to the masking effect of the cut. However, it cannot be assumed that there will be sufficient cuts in any piece of material for this to provide up to the required 4% reduction in the running, and therefore this method will not be appropriate for all material.

An example will now be described of a method that provides for widely varying amounts of time contraction, with much reduced motion judder Referring to FIG. 1, there is shown diagrammatically a compressed video sequence 102, comprising a series of intra-coded (I), prediction-coded (P) and bidirectionally-coded (B) frames. The time axis is represented horizontally across the page. Temporally adjacent pairs of B-frames, such as frames 104, are selected and are combined to form an intermediate frame 106 (designated B* in FIG. 1). The perceived effect of the combination should be taken into account when selecting B-frames. Typically, pairs of frames over which there is little change in picture content will be selected as being the least perceptible. This may be assessed using picture differencing or by comparing motion vectors. Additionally an accompanying audio stream, or even auxiliary information pre-inserted into the video stream may be used in selecting pairs of frames, as will be explained below.

The number of pairs of frames so selected will obviously depend on the desired reduction in program length. In this case, pairs of frames which introduce the least noticeable effects should be combined first, until the desired time reduction is achieved. Conversely, in certain applications, a quality threshold may be preestablished, and the input sequence will be shortened to the maximum extent within that quality threshold.

In the case of the intermediate frame being an simple of the two selected frames it will be appreciated, with reference to the schematic picture sequence 108 in which the intermediate frames are shown as being half way between the frames from which they were derived, that this will result in less motion judder than if one of the selected B frames had simply been deleted. In a more sophisticated embodiment the intermediate frame may be interpolated from the two selected frames, for example using motion vectors associated with those frames.

Once the intermediate frames have been substituted for pairs of selected B-frames, the timing of the picture sequence is then adjusted so that it is output at the standard (uniform) frame rate, as illustrated by sequence 110. It can be seen that the overall run-length of the sequence is reduced by an amount represented by numeral 112, with little or no reduction in picture content and minimum motion disruption.

By analogy, it can be seen that the program length can be increased by replacing—for example—two candidate B-frames, by three or more frames. Typically, the selected B-frames will be left in the signal and simply one or more B-frames inserted between them.

Figure 2:
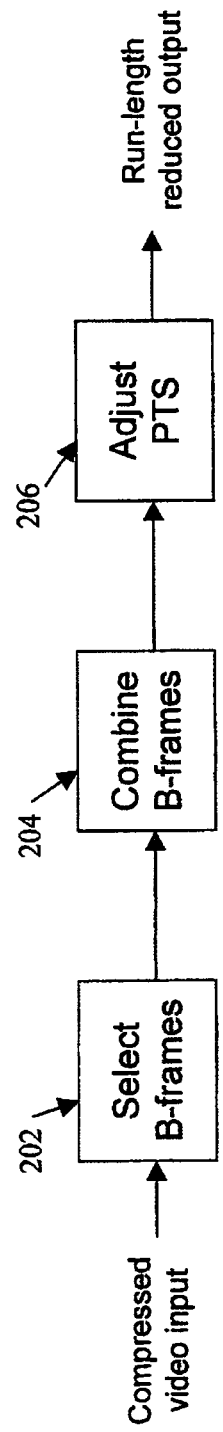
FIG. 2 is a schematic block diagram of an embodiment of the present invention.

FIG. 2 illustrates an apparatus for performing the process shown in FIG. 1. A compressed, MPEG-type video stream is input to block 202, where pairs of temporally adjacent B frames are selected. In block 204, selected pairs of frames are combined as described above, and substituted by the resulting intermediate frame. Finally, in block 206, the Presentation Time Stamps of the sequence are amended to produce a run-length reduced output with frames being displayed at the standard frame rate.

Figure 3:
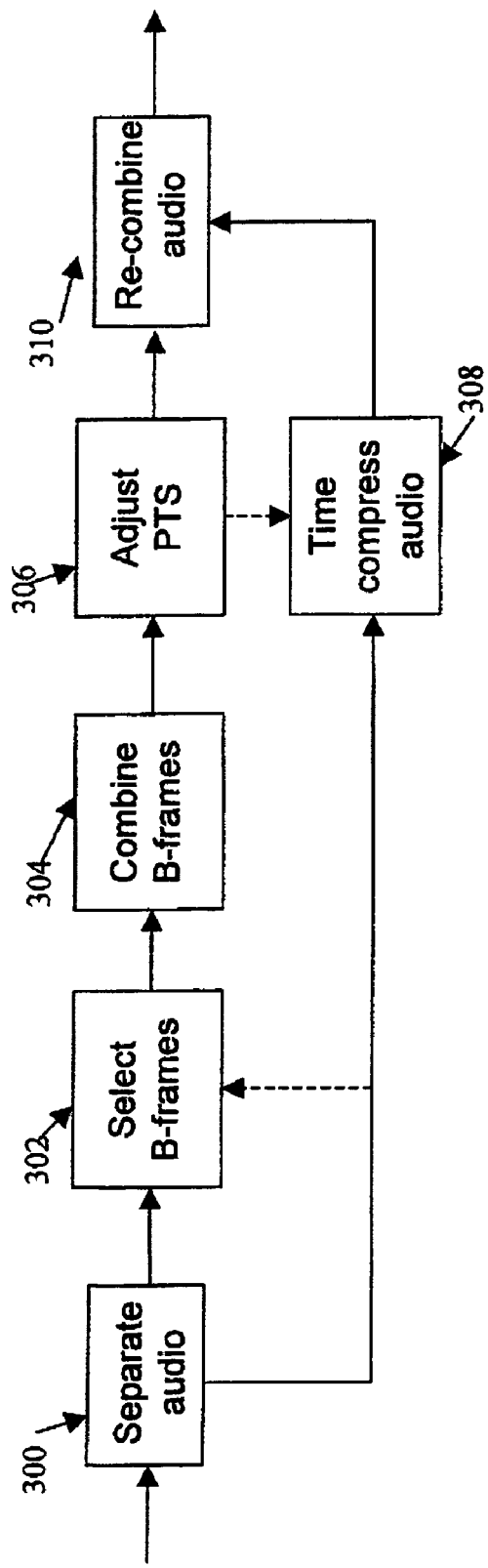
FIG. 3 is a schematic block diagram of a modification of the embodiment of FIG. 2.

FIG. 3 schematically illustrates a modification of FIG. 2 in which the input to the apparatus contains both video and related audio in a compressed format, such as in a transport stream. The audio is separated in block 300 with video passing to block 302 and audio passing to block 308. Additionally, the audio is analysed and information from the audio stream may be used in block 302 to assist in selecting appropriate B-frames for combining. For example, frames which when combined are likely to lead to a loss of lip-synch (ie. where there is speech accompanying the video) can be selected as a low priority. It is noted however that lip synch will typically be addressed at a later processing stage. Selected B-frames are combined as before in block 304 and PTS adjusted in block 306. The audio is time compressed in block 306 to correspond to the time compressed video, using information relating to the adjusted PTS of the video. Typically, the audio will be uncompressed and a wide variety of techniques are known for audio compression (or expansion if appropriate). Finally the audio is recombined with the video in block 310 to form a single time compressed output stream.

Turning now to FIG. 4, there is shown in more detail the content of the "Combine B-frames" block of FIGS. 2 and 3.

The MPEG Elementary Stream is demultiplexed at block 400 to obtain quantized DCT coefficients, coded motion vectors and coded coding modes. The coding modes are decoded at block 402 to obtain coding mode information such as quantizer scale code, DCT type and macroblock prediction modes according to the MPEG specification. Likewise, the motion vectors are decoded at 404. The quantized DCT coefficients are passed through an inverse quantizer 406 to obtain raw DCT coefficients. All these signals are passed through frame delays 408 so that the remainder of the circuit has simultaneous access to the information relating to two consecutive frames—in particular, to the two consecutive B-frames to be combined. Under control of the decision logic, the decoded information is combined by switching or mixing, re-encoded and re-multiplexed to obtain an output bitstream for the combined B-frame.

It is then the task of the decision logic 410 to determine how the two frames may be combined to produce an output frame. This decision is made on a macroblock basis and implemented in blocks 412, 414 and 414 in the coefficient, vector and decision mode paths, respectively. The decision will typically depend on comparisons between the coding modes and motion vectors of the two frames. Several methods may be used according to the decision made.

For example, if the two frames have identical coding modes and motion vectors, the DCT coefficients of the two frames can be averaged and the coding modes and motion vectors simply passed to the output. In this case, the output of a downstream MPEG decoder for the macroblock concerned will consist of an average of the macroblocks that would have been decoded from the two original frames.

If the coding modes are identical but the motion vectors differ slightly, it may be appropriate to form an average of the motion vectors (in addition to an average of DCT coefficients) to pass to the output. In this case, the output of a downstream MPEG decoder will not necessarily be identical to an average of original macroblocks, but will be close to the extent that a prediction macroblock obtained by averaging two motion vectors approximates the average of the two prediction macroblocks obtained by applying the two motion vectors in turn.

If the coding modes are identical except in that one macroblock is forwards predicted and the other is backwards predicted, the DCT coefficients can be averaged, the two motion vectors passed to the output and the coding mode set to bidirectional prediction.

If none of the above applies, other possibilities remain. One possibility is to select all the information from one of the two frames and pass it to the output. The effect of this would be to replace the macroblock concerned with the corresponding macroblock from one of the original frames. This may sometimes compromise the perceived quality of the downstream decoded picture for the macroblocks concerned. Another possibility is to use an offline processor to perform further decoding of the original macroblocks to the pixel domain, create an interpolated macroblock (with or without motion compensation) and re-encode the interpolated macroblock for insertion into the output bitstream. This would improve the downstream picture quality but at the expense of further processing for some macroblocks.

In the case where it is desired to increase the program length, a frame combined in any of the above described ways from two candidate frames, can be inserted between those two frames. Of course, more than one new frame can be inserted, if required.

It should be pointed out that the number of macroblocks that may be combined easily in the bitstream domain without loss of quality (for example, using the coefficient averaging method above) may be maximized by suitable upstream encoding according to the invention. For example, pairs of B-frames that are known to be candidates for replacement by a combined B-frame may be constrained to use identical coding modes and motion vectors, or may be constrained to use forward or backward prediction in a way that would allow coefficient averaging with a switch to bi-directional coding.

Figure 5:
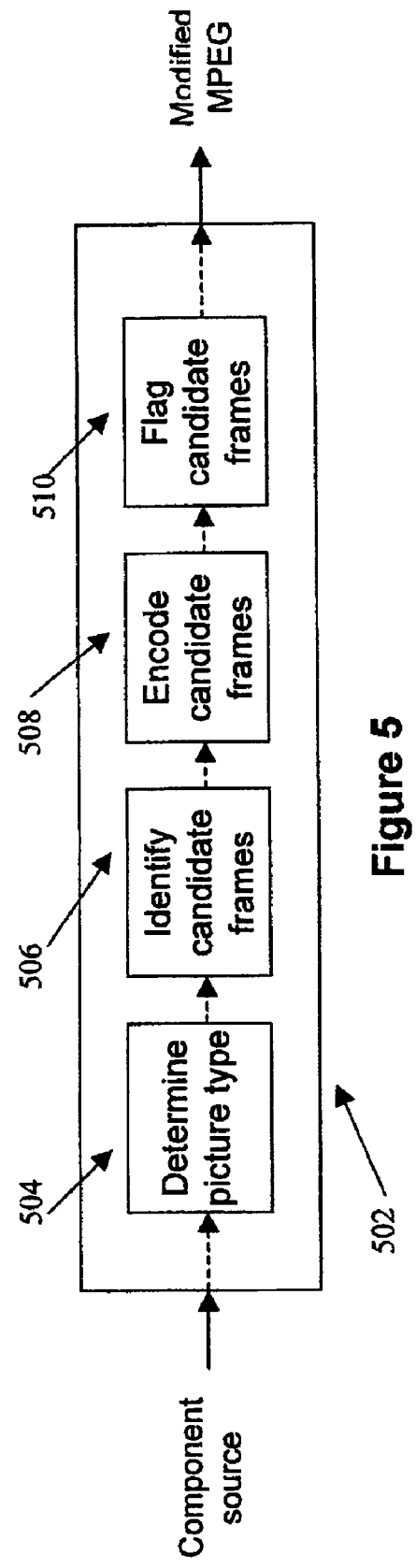
FIG. 5 is a schematic block diagram of a further embodiment of the present invention.

In this context, an MPEG encoder according to the invention will now be described. An MPEG coder 502 is illustrated schematically in FIG. 5. Within the coder the picture type (intra-coded (I), prediction-coded (P) or bidirectionally-coded (B)) is determined at stage 504, and temporally adjacent frames which are to be bidirectionally-coded are identified at stage 506. Once identified, candidate frames are then bidirectionally-coded according to well known MPEG techniques at stage 508, but using the same coding modes (eg. DCT type, quantization, weighting) for each pair of candidate frames. The thus coded pairs of candidate frames are then flagged as such at stage 510. This is achieved using meta data, and allows a downstream time compression coding process to easily select candidate frames for combining simply by reading the meta data, rather than having to consider the frames themselves.

In an extension of the coder described above, candidate frames are analysed in the coder and the perceived effect of combining them in a time compression process is assessed. This may be performed using the input pixel values or by using the coded data, such as motion vectors. The result of this assessment is then encoded with the candidate frames, again using meta data. This may take the form of a simple absolute value or grade for each pair of frames. In this way, downstream time compression of the modified MPEG output can be performed more easily, since candidate frames which are to be combined have already been identified and graded in the coding process, and it only remains for the meta data to be read, for the candidate frames to be combined, and for the corresponding timing adjustment. The combination is performed in order of the perceived effect (least perceptible frames being combined first) on the video, as determined at the coding stage. As already explained the number of frames to be combined will depend on control information such as the desired reduction in run-length.

In a further extension of this embodiment, the combination of candidate frames to form an intermediate frame is performed at the encoder. This combination is as already described, but rather than replacing two candidate frames with a single intermediate frame, each candidate frame is replaced by the intermediate frame. The candidate frames will preferably be combined to form an intermediate frame that is then encoded. Thus although the majority of the processing for time compression is performed at the encoder, the output is not time compressed and contains the same number of frames as the input to the coder. This results in even greater simplification of the downstream time compression process, where it is simply required to delete one of a pair of the identical intermediate frames, and to adjust the timing of the frames accordingly. The candidate frames will also typically be flagged and have graded using meta data, as before.

It should be understood that a combination of the above described coding methods could equally be employed. For example, based on the assessment of the candidate frames, only those most suitable for combining in a time compression process would actually be combined at the coder. Less suitable candidate frames could be flagged and graded, with accompanying motion vectors made available in the meta data for assisting time compression processing.

Considering now a later time compression process, a simple apparatus only capable of deleting frames and re-timing could be used to provide a low degree of time compression, utilising those frames which have been combined at the encoder. A more complex apparatus, could achieve a higher degree of time compression by additionally processing candidate frames which still require combining.

The invention has been described by way of example only, and preferred features may be provided independently or in combination.

Whilst the invention has been described with reference to MPEG 2, it will apply to MPEG 4 and to many other compression schemes which utilise a prediction category comprising frames which are not employed in the prediction coding of other frames. The concepts of using motion vectors as described; of averaging transformed coefficients; enforcing common coding modes in candidate frames and flagging candidate frames (preferably with a ranking as to suitability for use in time change downstream) will similarly apply to other coding schemes. Whilst the main applications of this invention will be in "global" time change, there may be applications where the methods and apparatus here described can be used in relatively short term time changing, to provide slow motion or other special effects in a simple and efficient manner.

We claim:

1. A method of changing a video program length by processing, using a processor, a compressed video signal which represents the video program, the compressed video signal including frames in different prediction categories, one prediction category comprising frames (B-frames) which are not employed in the prediction coding of other frames, the method comprising the steps of:
   selecting at least two temporally adjacent B-frames;
   combining, using said processor, said selected B-frames to create at least one intermediate frame; and
   inserting said intermediate frame or frames into the compressed video signal to change the program length of the video program.

2. A method according to claim 1, wherein temporally adjacent B-frames are selected in dependence upon a measured difference between adjacent frames.

3. A method according to claim 1, wherein the compressed video signal includes motion vectors for each B-frame and wherein temporally adjacent B-frames are selected in dependence upon the motion vectors of adjacent frames.

4. A method according to claim 1, wherein the step of combining frames comprises taking an average of those frames.

5. A method according to claim 1, further comprising adjusting the presentation time stamps of the signal to ensure that the output frames are played at the desired frame rate.

6. A method according to claim 1, wherein candidate frames are replaced by a smaller number of intermediate frames to decrease video program length.

7. A method according to claim 1, wherein an audio signal accompanying said video signal is time compressed or expanded to a corresponding degree.

8. A method according to claim 7, further comprising the step of correcting for any loss of lip-synch.

9. Apparatus for changing a video program length by processing a compressed video signal which represents the video program, the compressed video signal including frames in different prediction categories, one prediction category comprising frames (B-frames) which are not employed in the prediction coding of other frames, the apparatus comprising:
   a frame selector for selecting at least two temporally adjacent B-frames;
   a frame combiner adapted to combine said selected B-frames to create at least one intermediate frame; and
   means for replacing said selected B-frames with said intermediate frame or frames.

* * * * *